(12) United States Patent
Jain

(10) Patent No.: US 11,943,349 B2
(45) Date of Patent: *Mar. 26, 2024

(54) AUTHENTICATION THROUGH SECURE SHARING OF DIGITAL SECRETS PREVIOUSLY ESTABLISHED BETWEEN DEVICES

(71) Applicant: DISH Technologies L.L.C., Englewood, CO (US)

(72) Inventor: Vikal Kumar Jain, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 499 days.

This patent is subject to a terminal disclaimer.

(21) Appl. No.: 17/183,257

(22) Filed: Feb. 23, 2021

(65) Prior Publication Data

US 2021/0184847 A1 Jun. 17, 2021

Related U.S. Application Data

(63) Continuation of application No. 16/021,217, filed on Jun. 28, 2018, now Pat. No. 10,931,448.

(51) Int. Cl.
*H04L 9/08* (2006.01)
*H04L 9/32* (2006.01)
*H04L 9/40* (2022.01)

(52) U.S. Cl.
CPC ............ *H04L 9/0877* (2013.01); *H04L 9/321* (2013.01); *H04L 63/0876* (2013.01)

(58) Field of Classification Search
None
See application file for complete search history.

(56) References Cited

U.S. PATENT DOCUMENTS

| | | |
|---|---|---|
| 8,350,971 B2 | 1/2013 | Malone et al. |
| 9,369,282 B2 | 6/2016 | Pal |
| 9,674,257 B2 | 6/2017 | Eyler et al. |
| 2006/0094401 A1 | 5/2006 | Eastlake |
| 2010/0058064 A1 | 3/2010 | Kirovski et al. |
| 2010/0232438 A1 | 9/2010 | Bajpai et al. |
| 2011/0153718 A1 | 6/2011 | Dham et al. |
| 2011/0191456 A1 | 8/2011 | Jain |

(Continued)

FOREIGN PATENT DOCUMENTS

WO 2006086721 A2 8/2006

OTHER PUBLICATIONS

Written Opinion of the International Searching Committee for International Application No. PCT/US2019/038759 dated Jan. 7, 2021 (7 pages).

*Primary Examiner* — Christopher C Harris
(74) *Attorney, Agent, or Firm* — KW Law, LLP

(57) ABSTRACT

Applications executing on phones, tablets and other client devices can be designed to authenticate with network services, but reliably identifying a client device that is not previously known to the service can be difficult. A television receiver or other trusted device that is previously known to the service, however, can act as an intermediary for initially delivering the client's identifying data to the authentication service. After the authentication service has received reliable identifying information about the client from another trusted device, the service is able to directly authenticate the client device in subsequent transactions by requesting and verifying receipt of the same secret identifier.

19 Claims, 2 Drawing Sheets

(56) References Cited

U.S. PATENT DOCUMENTS

| | | |
|---|---|---|
| 2011/0196521 A1 | 8/2011 | Jain et al. |
| 2012/0117590 A1 | 5/2012 | Agnihotri et al. |
| 2012/0213055 A1 | 8/2012 | Bajpai et al. |
| 2012/0284786 A1 | 11/2012 | Somani et al. |
| 2013/0007816 A1 | 1/2013 | Krikorian et al. |
| 2013/0046990 A1 | 2/2013 | Fahrny et al. |
| 2014/0310416 A1 | 10/2014 | Durbha et al. |
| 2015/0215284 A1 | 7/2015 | Paul et al. |
| 2016/0050565 A1 | 2/2016 | Benoit et al. |
| 2016/0117673 A1 | 4/2016 | Landrok et al. |
| 2017/0070417 A1 | 3/2017 | Jain et al. |

AUTHENTICATION THROUGH SECURE SHARING OF DIGITAL SECRETS PREVIOUSLY ESTABLISHED BETWEEN DEVICES

PRIORITY CLAIM

This application is a continuation of U.S. patent application Ser. No. 16/021,217, filed on Jun. 28, 2018, which is incorporated herein by reference.

TECHNICAL FIELD

The following discussion generally relates to digital communications, particularly to authentication of digital communications that take place over digital networks. More particularly, the following discussion relates to authenticating devices, applications and/or users of devices via a digital network.

BACKGROUND

Digital devices such as smartphones, tablets, portable computers and the like have revolutionized everyday life. As the power and connectivity of such devices continues to improve, users continually demand access to new and more powerful applications. Video streaming, for example, has become commonplace so that users can watch selected video content at virtually any time and place using their mobile devices. Similarly, many different web services are now available that provide a wealth of content to mobile devices via the Internet or other digital networks. Typically, it is desirable to authenticate the identity of a user (or a device operated by that user) to prevent unauthorized access to restricted content, services and/or the like.

In practice, however, there are various technical challenges to efficient yet reliable authentication of digital communications between devices. To provide just one example, most modern computing devices are provided from the manufacturer with digital certificates or other digital credentials that are "burned in" to the device hardware or firmware, and are therefore very reliable. This "hard wired" credential can be very useful in identifying the device in certain contexts, but access to the device credential is often severely restricted by the manufacturer. This limited access can prevent developers other than the device manufacturer from uniquely and reliably identifying the device (or its user) for their own purposes. As a result, it can be a substantial challenge to reliably identify a unique device that is communicating via a digital network.

It is therefore desirable to create systems and methods to efficiently yet securely authenticate devices, applications and/or users prior to granting access to data or services in a networked digital communications setting. Other desirable features and characteristics will become apparent from the subsequent detailed description and the appended claims, taken in conjunction with the accompanying drawings and this background section.

BRIEF SUMMARY

Various embodiments provide systems, devices and processes to leverage trust in a set top box (STB), video appliance and/or other home device to efficiently yet securely authenticate users or devices for access to other applications, web services, and/or other resources.

Various embodiments provide an automated digital authentication process executed by a mobile phone, tablet or other client device to authenticate the client device with a security server via a network. The automated process suitably comprises: generating, by the client device, a digital secret; transmitting the digital secret from the client device to a trusted home device that is in secure communication with the security server and that has previously established a trusted relationship with the security server to thereby permit the trusted home device to securely forward the digital secret created by the client device to the security server via the network for storage of the digital secret by the security server; subsequently providing the digital secret from the client device to the security server in a request to authenticate the computer system; and in response to the security server successfully comparing the digital secret subsequently provided from the client device to the digital secret previously received from the trusted home device, the client device receiving an authentication message that provides access to a network service.

Other embodiments provide a mobile telephone, tablet, computer system or other client device that authenticates with a security server via a wide area network. The client device suitably comprises: a processor; a network interface to communicate via a local area network; and a memory that stores computer-executable instructions that, when executed by the processor, perform one or more of the automated processes substantially as described herein.

Still other embodiments provide a data processing system comprising: a backend security server coupled to a wide area network; a trusted device having a processor, a memory and an interface to communicate on a local area network, wherein the trusted device maintains a secure data connection with the backend security server via the wide area network so that the home device is trusted by the backend security server; and a security module that is stored in a memory of a client device having a client processor and a client interface to the local area network. The security module comprises instructions that, when executed by the client processor, cause the processor to perform one or more of the various automated processes described herein.

Various additional embodiments, examples, aspects and other features are described in more detail below.

BRIEF DESCRIPTION OF THE DRAWING FIGURES

Example embodiments will hereinafter be described in conjunction with the following drawing figures, wherein like numerals denote like elements, and:

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

As noted above, various embodiments are able to authenticate devices, applications and/or users of devices through the sharing of secrets initially established with a set top box, television receiver, placeshifting device, video game player, personal computer or other trusted home device. Because the home device typically has a high level of trust relative to the client device, the home device can be made to "vouch" for the less trusted client device through secrets that are shared between the client device and the trusted home device. Trust in the client device can be further elevated by the trusted home device verifying that the client device is operating on the same local area network (LAN) as the home device. That is, by generating trust between the client device and the home device, the trust previously established with the home device can be extended to the client device.

In particular, applications executing on a client device can be designed to authenticate with services operating on a network, but the network service cannot typically identify the client device (or applications operating on the client device) until the identity of the device is initially established. A different device that is previously known to the service, however, can act as an intermediary in initially delivering the client's identifying data to the network service. After the network service has received reliable identifying information from the client, the service is able to directly authenticate the client device in subsequent transactions by requesting and verifying receipt of the same secret identifier. Various embodiments may expand upon these basic concepts in any number of ways, several of which are set forth below.

Figure 1:
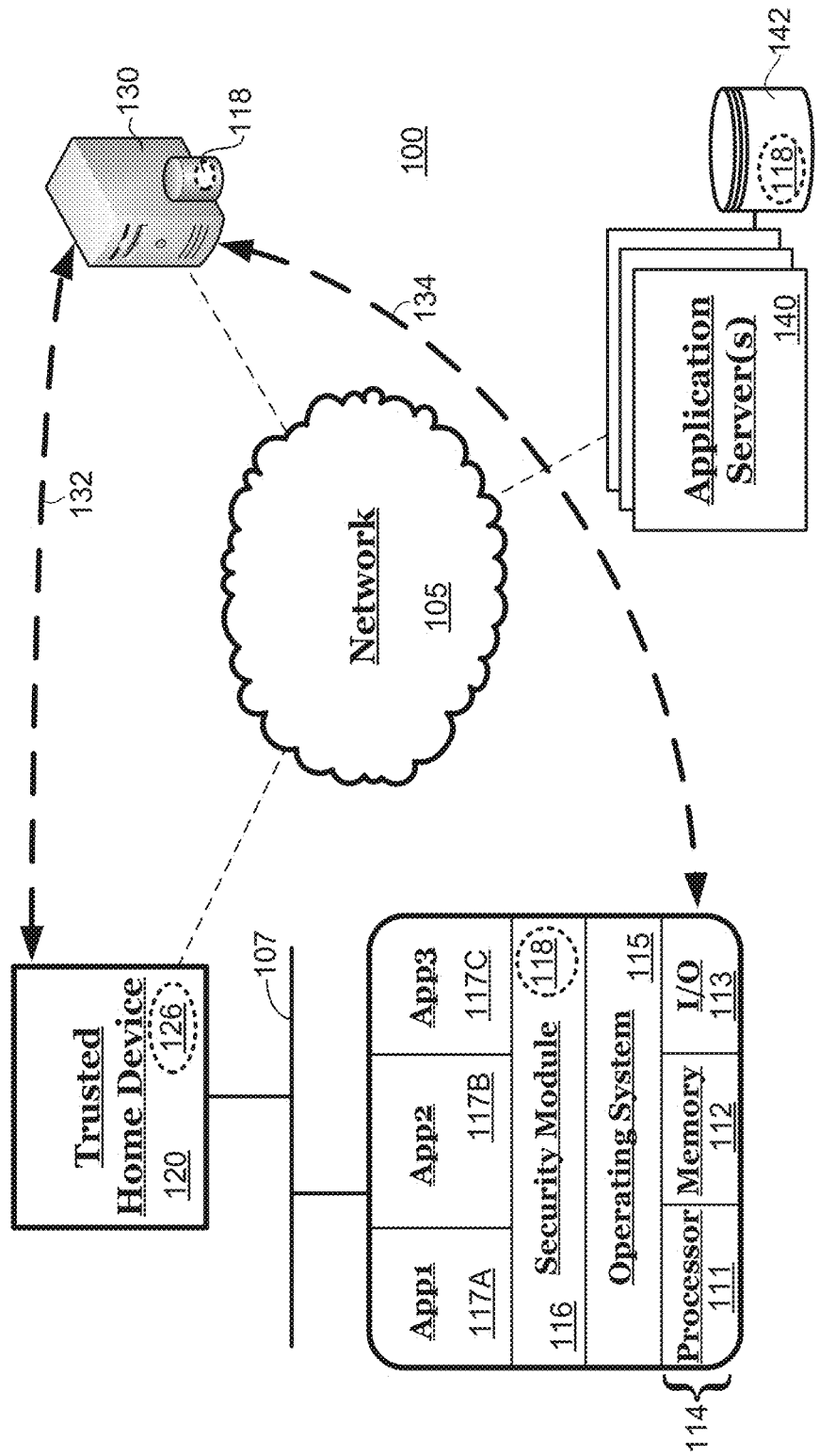
FIG. 1 is a diagram of an example system for performing authentication based upon a secret initially shared between a home device and a client device.

With reference now to FIG. 1, most homes, offices and other customer environments now include one or more digital video recorders (DVRs), set top boxes (STBs) or other digital television receivers, placeshifting devices, video game players and other hardware-type home devices 120. Generally these devices are installed to communicate via a local area network (LAN) 107 at the user's home or other premises, and are primarily operated by users who live or work at the premises, and who are typically subscribers to a broadcast television, media streaming, video gaming or other service.

Often, home devices 120 have pre-established arrangements for secure communications with a remote backend security service 130 via network 105. Typically, communications between the home device 120 and the backend security service 130 are reliably secure so that secrets can be exchanged without fear of interception. This security can be based upon credentials in the home device's hardware or firmware that are presented to the security service 130 via transport layer security (TLS) and/or other encrypted data communications. In some cases, certain types of home devices 120 (e.g., STBs) are professionally installed at the user's premises by trusted personnel, thereby adding to the level of trust in the device 120. That is, the home device 120 can often be reliably associated with authorized users of the hardware due to physical delivery and/or installation of the hardware to a known physical location by a trusted technician; this trust is maintained and enhanced through secure communications to and from the home device 120 after installation.

Data connections with phones, tablets, portable computers and other client devices 110, however, are often considered to be much less trustworthy. Consumers typically operate any number of different client devices that are received from different retailers and service providers, so it is generally impractical to provide security through trusted delivery or installation channels. Moreover, although many client devices are designed with internal digital credentials that identify the device with a high level of confidence, these credentials are often not available to third party developers of applications 117A-C that run on the device 110. Devices manufactured by the Apple Corporation of Cupertino, Calif., for example, typically have secure internal codes that are used by the device manufacturer, but that are not made available to other developers. As a result, it can be beneficial for third party applications 117 to leverage another trusted device (e.g., the home device 120) to vouch for the more unknown client device 110. This can be accomplished by using the trusted device 120 as an intermediary to deliver secret identifying information from the client device no to a backend authentication server 130 or the like.

As illustrated in FIG. 1, the trusted home device 120 is a television receiver, set top box (STB), digital video recorder (DVR), video game player, media player and/or the like. In a particular example, home device 120 is a STB that receives broadcast television signals from a direct broadcast satellite (DBS), cable, IPTV or other television content provider. Frequently, a technician retained by the content provider visits the customer's premises to physically install the device 120, thereby providing a high level of confidence that the device 120 is operated by a particular customer at a particular geographic location. Home device 120 typically communicates with the Internet 105 or the like via the customer's home or office network 107 (e.g., a wired or wireless local area network (LAN)) to provide additional features such as time and/or placeshifting, home monitoring and control and/or other functions as desired.

Home device 120 is typically a consumer-operated hardware device that includes computing hardware, including one or more microprocessors or digital signal processors, memory, mass storage and input/output interfaces as desired. Home device 120 typically executes an operating system and appropriate software and/or firmware to carry out the various functions. In the example illustrated in FIG. 1, home device 120 includes a security module 126 implemented with any combination of hardware, software and/or firmware. Typically, security module 126 is a firmware or software module that resides in memory (or other digital storage) and that includes appropriate instructions to be executed by a processor of home device 120 to carry out the various functions described below relating to handling of secrets with one or more client devices 110.

Secure communications 132 can occur between the home device 120 and a remote backend security service 130. Backend service 130 is typically a computer server having a processor, memory and input/output interfaces. In various embodiments, service 130 may make use of "cloud-type" storage, processing and/or other hardware abstraction services such as Amazon Web Services (AWS), Microsoft Azure and/or any other "infrastructure-as-a-service" (IaaS) or "platform-as-a-service" (PaaS) provider, as desired. Other embodiments may be implemented entirely with hardware that is physically located at the customer's home or other premises.

Generally speaking, security service 130 executes software, firmware or other logic to authenticate users and/or devices operating within system 100. Authentication usually involves the requesting person or device to provide a digital credential that is unique to the requester. A device may submit a secret identifier or other digital code that is known only to that device, for example. A user may be able to authenticate by provide a userid/password combination, biometric data, a code transmitted to a known device, or some other secret information known only to the authenticating party. Secret information is transferred to the security service 130 via secure communications 132 to prevent unauthorized interception of the secret by other users of network 105. In various embodiments, communications 132 are provided over TCP or UDP protocols that are secured by TLS or similar mechanisms. Secret data may be further encrypted for transit using public/private keys, symmetric keys shared between the communicating devices, and/or other cryptographic techniques as desired.

As noted above, home device 120 typically has a digital identifier that is known to the security service 130 that that uniquely identifies the home device 120 to the service 130. This identifier can be securely transmitted from the home device 120 to service 130 via network 105 using TLS or similarly-secure communications, as described above. Upon receipt of the secret, service 130 compares the received identifier to a previously-stored copy; if the received secret matches the previously-stored identifier, the requesting party can be confirmed to be authentic. Various embodiments may further provide authorization services to the authenticated party by granting or denying access to one or more services. Security service 130 could grant access to placeshifting or other media streaming services, for example. Other embodiments could authorize access to video gaming, electronic commerce, messaging or social networking systems, and/or any other services as desired.

As noted above, client device 110 may not have its own unique identifier, or the identifier may not be available to one or more programs 117 that are operating on the client device. It is therefore beneficial to generate a new secret identifier 118 that is associated with the device 110 and that can be subsequently used to reliably identify device 110. Challenges arise, however, in reliably delivering the identifying secret 118 to the backend service 130 without allowing unauthorized interception or duplication of the secret. These challenges can be overcome (or at least reduced) by using home device 120 as a trusted intermediary to deliver the secret 118 to the backend service 130.

Client device 110 is any mobile phone, tablet computer, computer system, video game player, media player or other computing device. In various embodiments, client device 120 is a phone or tablet capable of communicating with home device 120. In the example illustrated in FIG. 1, client device 110 suitably includes a processor 111, memory 112 and input/output interfaces 113. Interfaces 113 may include, for example, network interface circuitry for interfacing with a wired or wireless local area network (LAN) 107, as desired. Some embodiments may additionally or alternately include interfaces to personal area networks, mobile telephone networks, point-to-point data links and/or the like.

Client device 110 typically executes an operating system 115 that provides an interface between one or more application programs 117 and the system hardware 114. Various embodiments also provide a security module 116 to generate and share a secret 118 that is used to authenticate the device 110 with security service 130 and/or application services 140. To that end, security module 116 is typically implemented as software or firmware instructions that are stored within memory 112 or other storage available to device 110 for execution by processor 111. In the example shown in FIG. 1, security module 116 is illustrated as a middleware layer that provides secure services to multiple application programs 117. Equivalent embodiments, however, could incorporate the functions and features of security module 116 into one or more programs 117 themselves. That is, one or more programs 117 may incorporate the security features attributed to security module 116 herein. Further, multiple programs 117 may each provide their own separate security features 116, if desired. That is, different applications 117 executing on the same client device 110 may each generate their own identifying secrets 118 that can be used to authenticate with different services 130, as desired.

In operation, the client device 110 and home device 120 are able to discover each other and communicate via home network 107. Network 107 may be a wired or wireless LAN, for example, or a collection of bridged or gated LANs operating within a home, office or similar environment. Home device 120 can readily confirm that the client device 110 is operating on the same LAN through, for example, verification of IP or MAC addresses, analysis of LAN traffic, and/or other factors. Because the devices 110 and 120 are operating on the same LAN, they can readily share a secret using secure Wi-Fi or the like, thereby allowing client device 110 to securely share a secret with trusted device 120.

Home device 120, in turn, is trusted by security service 130 and maintains secure communications 132 with the security service 130 over 105. This trust allows device 120 to relay the secret 118 established with client device 110 to the security service 130 via a secure connection 132. Security service 130 can then store the received secret 118 for later use in authenticating client device 110. Moreover, because client device 110 and security service 130 now share a secret 118 that is unique to the device 110 (or at least a user of the device 110), subsequent authentication of the device and/or user can occur through directly contact with security service 130 via a separate connection 134 (e.g., a mobile telephone connection, or a different path through network 105), without relying upon trusted device 120 as an intermediary.

In various embodiments, this concept can be expanded to allow storage of the secret 118 in a database 142 that is associated with a user account or the like. This allows a user to access the secret from other devices 110 by providing a userid/password pair, biometric identifier, or the like, thereby allowing the secret identifier 118 to authenticate the user without regard to the specific hardware that the user is operating. Additional detail about these embodiments is provided below.

Figure 2:
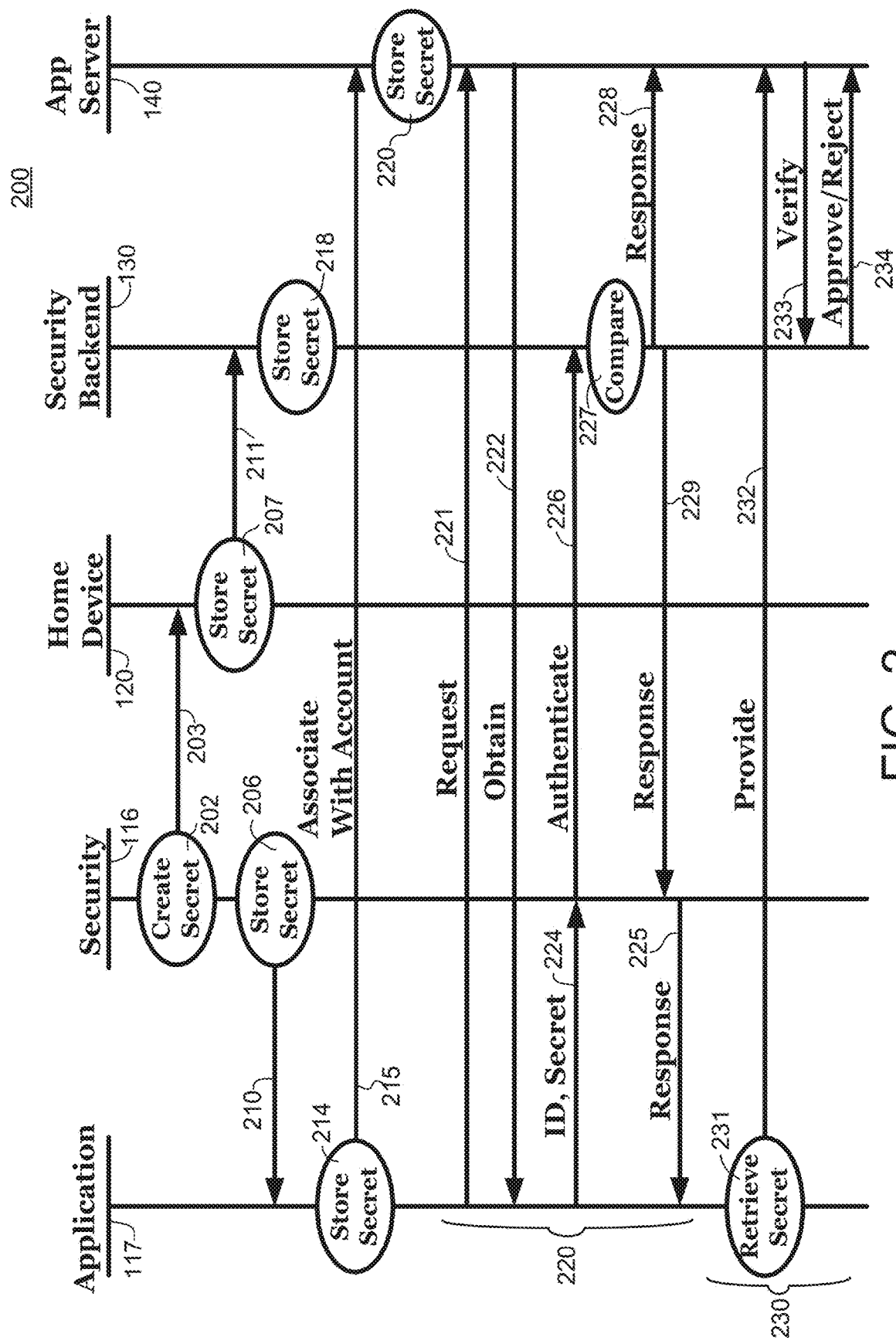
FIG. 2 is a diagram of an example process for authenticating devices, applications and/or users based upon a secret initially shared between a home device and a client device.

FIG. 2 illustrates example processes 200 that can be used to establish and exploit secrets between trusted home devices 120 and less trusted applications 117 for efficient yet effective authentication. FIG. 2 separately illustrates security module 116 and application 117 to illustrate additional detail of process 200. In practice, however, a single application 117 could incorporate the features of security module 116, as desired. That is, the logic that implements security module 116 may be physically and/or logically integrated within one or more applications 117. Alternatively, security module 116 may be a separate application, middleware component, plug-in or the like that could interoperate with multiple applications 117, as desired.

As shown in FIG. 2, a secret 118 is initially created and shared between the home device 120 and security module 116 of a client device no (functions 202, 203). Although FIG. 2 shows the secret 118 being generated by the security module 116 and transferred 203 from the client device 110 to the home device 120, equivalent embodiments could generate the secret 118 by the home device 120 and/or by both devices 110, 120 acting in tandem, with information sharing 203 as appropriate.

In some implementations, the secret 118 is generated when the client device no is operating on the same LAN 107 (or home network) as the home device 120, thereby ensuring that the two devices are in relatively close physical proximity (e.g., physically located within the same home or similar premises, and having access to the same home networks). This can be verified by the home device 120 through evaluation of IP and/or MAC addresses, ETHERNET or similar traffic on LAN 107, and/or the like. Moreover, security modules 116 and 126 may be designed to increase trust between client device no and home device 120, respectively. Other embodiments could verify or enhance the level of trust between the client device 110 and the home device 120 prior to secret generation 202 in any other manner.

After the secret 118 is generated and shared between the home device 120 and the security module 116 of client device no, the secret 118 may be stored and/or shared as desired for subsequent authentication. In various embodiments, home device 120 is able to store the secret locally (e.g., in solid state or magnetic storage) for subsequent retrieval and verification (function 207). Storage of the secret 118 on home device 120 may not be needed, however, after the secret 118 is stored with security service 130 and/or database 142.

To that end, home device 120 is able to securely provide the secret 118 to backend security service 130 using TLS or other secure connections 132 (function 211) for storage at the backend server 130 (function 218). Security service 130 may store the secret 118 along with an identifier of home device 120 that can be used in subsequent authentication, if desired.

In some embodiments, client device no stores secret 118 in local memory 112 or other storage, as desired (function 206).

As noted above, security module 116 may be incorporated into an application program 117 itself. Alternatively, various embodiments could permit further exploitation of digital secret 118 by allowing security module 116 to share the secret 118 (and any associated identifiers) with separate applications 117 residing on client device 110 (function 210). Applications receiving the secret 118 may be restricted, if desired. Applications 117 may be allowed to store the secret 118 locally (e.g., in memory 112 or the like), as shown in function 214. Moreover, applications 117 may be allowed to store the secret (and any associated identifier for home device 120) in database 142 associated with a cloud or other remote service 140, particularly if the remote storage is associated with a user account or the like (function 216). That is, if a user of the device no has established an account with service 140, then the secret 118 may be stored with that account information for subsequent use on the same device no and/or different client devices, if desired.

One drawback of local-only storage is that each device no operated by the same user would require its own unique secret 118. That is, restricting storage of the secret 118 to the device itself would typically require each additional device operated by the same user to go through functions 203-214 on its own, often creating additional work for the user, as well as additional overhead to manage the multiple secrets 118 associated with the different devices. Remote storage allows a common shared secret 118 to be subsequently retrieved from other devices (assuming that the user has access to the account where the secret 118 is stored), thereby negating the need for each device 110 to maintain its own secret.

FIG. 2 illustrates two different processes 220, 230 that are examples of ways to use the remote storage feature. In process 220, the user of an application 117 (which may be executing on the same or a different device 110 from the device no that originally created the secret 118) is able to request (function 221) and obtain (function 222) the shared secret and any associated identifier data from the remote storage 140. Although not shown in FIG. 2, the process 220 will typically include verification of the user to server 140 through presentation of a userid/password combination, a biometric ID or the like before the secret 118 is retrieved from storage and returned to the application 117.

In the example 220, application 117 is attempting to obtain services through security backend 130, such as reconnecting to home device 120 and/or a different network service 140 for file sharing, placeshifting, video game playing or any other purpose. In this example, application 117 may direct a security module 116 present on the same device 110 to present the retrieved secret 118 to the security backend 130, as desired. To that end, the application 117 provides the secret 118 to the security module (function 224), which then forwards the submitted secret on to the security backend 130 for authentication (function 226). Security backend 130 is able to compare the submitted secret 118 against the stored copy of secret 118 that was previously submitted by home device 120 (function 227), thereby approving or rejecting the authentication request. The approval or denial may be provided back to security module 116 (function 229), which then forwards the result to the appropriate application 117 (function 225). Application 117 may then process the approval or denial as desired. Again, security module 116 may be equivalently implemented as a part of application 117, if desired.

In various embodiments, an approved authentication request will prompt security backend 130 to generate a token or similar credential that can be delivered to the application 117 for subsequent presentation at another service as proof that the authentication was successful. Application 117 may provide the token to the home device 120 and/or a network service 140 to establish a video streaming session, for example, or for any other purpose. In a further embodiment, service 130 may also provide the approval credential to the server that is requesting authentication (function 228) for subsequent comparison to credentials provided by application 117, if desired.

Note that equivalent embodiments of process 220 for authentication to services or hosts 140 other than home device 120. That is, the backend service 130 could equivalently notify a different service 140 or the like on network 104 in function 228, as desired. For example, backend service 130 could provide an authentication credential to application 117 (functions 229, 225) that is also shared with any other service 140 on network 105 (function 228). When the other service received the credential from the application 117, the two credentials could be compared to verify successful authentication. Note that the other server would not need access to the secret itself: if the other service trusts security backend 130 to vouch for the home device 110, then that level of trust can be used for very effective authentication.

Process 230 shows a similar process in which the application obtains the secret 118 from local or remote storage (function 231), and then presents the obtained secret 118 (and any associated identifiers) to another host 140 on network 105 (function 232). The host receiving the secret 118 then queries the security backend 130 (function 233) to determine if the secret is valid. The backend 130 sends a reply 234 confirming or denying authentication. This process 230 may be helpful in certain situations, but it potentially exposes the secret 118 to additional parties, thereby possibly weakening the security of the system. Nevertheless, it may be acceptable in some circumstances, depending upon the application and the level of trust that is needed.

Generally speaking, then, trust in a STB, television receiver, video game player or other home device can be used to authenticate other client devices. By using the trusted home device to securely relay a secret identifier that can be stored and/or presented for subsequent authentication, a reliable and secure form of device, application and/or user authentication can be provided.

Various embodiments could modify these general concepts in any number of ways. Any types or numbers of home or client devices could be used, and the concepts described herein could be readily applied in any number of different applications and settings beyond placeshifting or video streaming. Moreover, although frequent reference is made to "home" devices for familiarity and convenience, equivalent devices designed for deployment in offices, factories, schools or other premises could be equivalently used.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated digital authentication process to be performed by a client device to authenticate the client device with a security server via a network, the automated process comprising:
    generating, by the client device, a digital secret;
    transmitting, by the client device, the digital secret to a trusted home device that is in secure communication with the security server and that has previously established a trusted relationship with the security server to thereby permit the trusted home device to securely forward the digital secret created by the client device to the security server via the network for storage of the digital secret by the security server;
    directly providing the digital secret from the client device to the security server in a request to authenticate the computer system; and
    in response to the security server successfully comparing the digital secret directly provided from the client device to the digital secret received from the trusted home device, the client device receiving an authentication message that provides access to a network service.

2. The automated digital authentication process of claim 1 further comprising:
    the client device additionally transmitting the digital secret for remote storage via the network; and
    the client device subsequently retrieving the digital secret from the remote storage via the network prior to providing the retrieved digital secret to the security server in the request to authenticate the computer system.

3. The automated digital authentication process of claim 1 wherein the client device provides the digital secret to the home device via a local area network.

4. The automated digital authentication process of claim 3 wherein the trusted home device encrypts the digital secret received from the client device via the local area network prior to transmission of the encrypted digital secret via the network to the security server.

5. The automated digital authentication process of claim 4 wherein the digital secret is directly provided from the client device to the security service via a connection other than the local area network.

6. The automated digital authentication process of claim 5 wherein the connection other than the local area network is a mobile telephone connection.

7. The automated digital authentication process of claim 6 wherein the trusted home device is a television receiver, and wherein the client device is a mobile telephone.

8. The automated digital authentication process of claim 1 wherein the digital secret is subsequently provided from the client device to the security server via an application server that receives the digital secret from the client device via the network and that forwards the digital secret to the security server to authenticate the client device, and wherein, upon successful authentication of the computer system by the security server, the application server grants access to the client device.

9. A client device that authenticates with a security server via a wide area network, the client device comprising:
    a processor;
    a network interface to communicate via a local area network; and
    a memory that stores computer-executable instructions that, when executed by the processor, performs an automated process comprising:
    generating a digital secret;
    transmitting, by the client device, the digital secret device to a trusted home device via the local area network, wherein the trusted home device is in secure communication with the security server and has previously established a trusted relationship with the security server to thereby permit the trusted home device to securely forward the digital secret created by the client device to the security server via the wide area network for storage of the digital secret by the security server;
    directly providing the digital secret by the client device to the security server via the wide area network in a request to authenticate the computer system; and
    in response to the security server successfully comparing the digital secret directly provided from the client device to the digital secret received from the trusted home device, the client device receiving an authentication message that provides access to a network service.

10. The client device of claim 9, wherein the client device further comprises a second interface to the wide area network that is separate from the interface to the local area network.

11. The client device of claim 10 wherein the client device is a mobile telephone, wherein the interface to the local area network is an IEEE 802.11 interface, and wherein the second interface is a mobile telephone interface.

12. The client device of claim 11 wherein the trusted home device is a television receiver.

13. The client device of claim 11, wherein the computer-executable instructions further comprise instructions to: additionally transmit the digital secret for remote storage via the network; and to subsequently retrieve the digital secret from the remote storage via the network prior to providing the retrieved digital secret to the security server in the request to authenticate the computer system.

14. The client device of claim 11 wherein the digital secret is subsequently provided from the client device to the security server via an application server that receives the digital secret from the client device via the network and that forwards the digital secret to the security server to authenticate the client device, and wherein, upon successful authentication of the computer system by the security server, the application server grants access to the client device.

15. An automated process performed by a data processing system to authenticate a client device via a wide area network, the automated process comprising:
  receiving a first copy of a digital secret created by the client device, wherein the first copy is forwarded via a secure data connection over the wide area network from a trusted device that received the digital secret from the client device via a local area network;
  subsequently receiving a second copy of the digital secret directly from the client device via the wide area network in conjunction with a request to authenticate the client device;
  comparing the first copy of the digital secret received from the trusted device to the second copy of the digital secret received from the client device; and
  in response to the security server successfully comparing the first copy of the digital secret to the second copy of the digital secret, transmitting an authentication message that provides the client device with access to a network service on the wide area network.

16. The automated process of claim 15 wherein the client device is a mobile telephone, and wherein the mobile telephone is configured to communicate with the trusted device via an IEEE 802.11 interface and with the data processing system via a mobile telephone interface.

17. The automated process of claim 16 wherein the trusted device is a television receiver.

18. The automated process of claim 15, wherein the digital secret is additionally stored in a remote storage accessible to the client device via the wide area network, and wherein the client device subsequently retrieves the digital secret from the remote storage prior to providing the retrieved digital secret to the data processing system in the request to authenticate the computer system.

19. The automated process of claim 15 wherein the digital secret is subsequently provided from the client device to the data processing system via an application server that receives the digital secret from the client device via the network and that forwards the digital secret to the data processing system to authenticate the client device, and wherein, upon successful authentication of the computer system by the data processing system, the application server grants the client device access to the network service.

* * * * *